(No Model.)
A. C. DAGGETT.
BAKING OR ROASTING PAN.
No. 464,685. Patented Dec. 8, 1891.
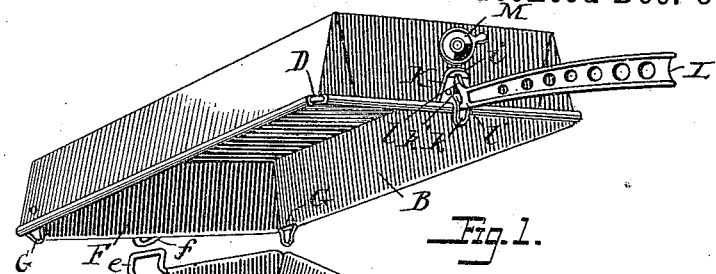
Fig. 1.
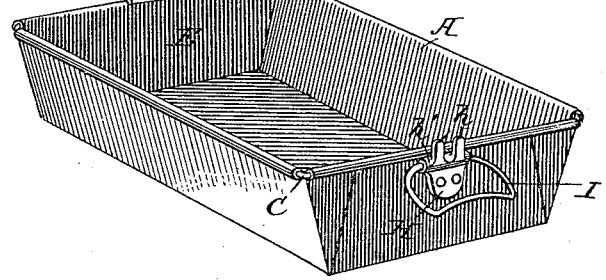
Fig. 2.
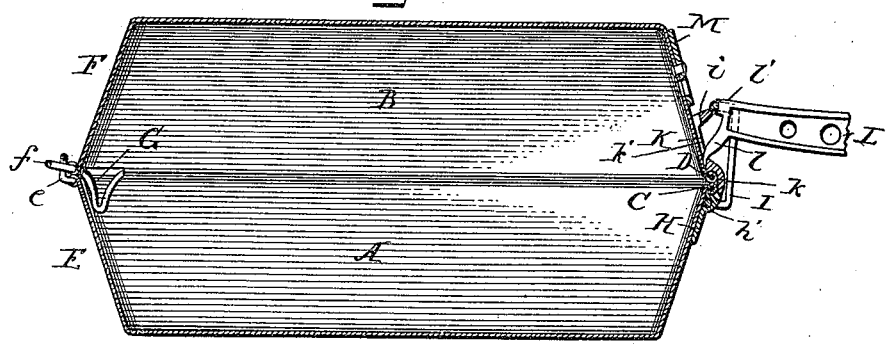
Fig. 3.
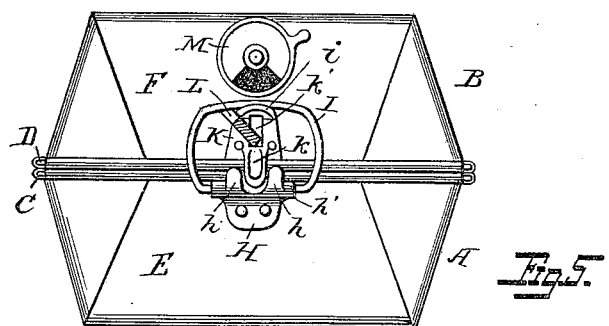
Fig. 4.
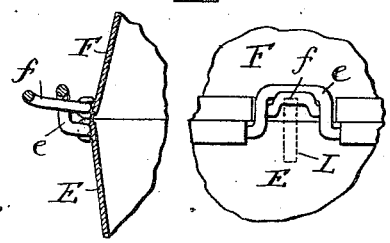
Fig. 5.
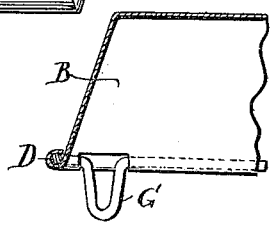
Attests:
Jno. G. Hinkel
H. S. McArthur
Arthur C. Daggett
Inventor
by Foster Freeman
Attys

UNITED STATES PATENT OFFICE.

ARTHUR C. DAGGETT, OF VINELAND, NEW JERSEY.

BAKING OR ROASTING PAN.

SPECIFICATION forming part of Letters Patent No. 464,685, dated December 8, 1891.

Application filed August 28, 1891. Serial No. 403,985. (No model.)

*To all whom it may concern:*

Be it known that I, ARTHUR C. DAGGETT, a citizen of the United States, residing at Vineland, Cumberland county, State of New Jersey, have invented certain new and useful Improvements in Baking or Roasting Pans, of which the following is a specification.

My invention relates to baking and roasting pans, and more particularly to that class of pans which consist, essentially, of two pans which are united together, with their largest sides adjusted together, and form an inclosing-pan for the bread to be baked or meat or other substance to be roasted.

The object of my invention is to improve the construction of such pans and to provide means whereby they may be more easily united and securely held together, and whereby they may be readily separated, while heated or otherwise, without danger of injury to the party handling the pans.

To these ends my invention consists in the features of construction and arrangement substantially as hereinafter pointed out.

Referring to the accompanying drawings, which illustrate the preferred embodiment of my invention, Figure 1 is a perspective view showing the two pans separated. Fig. 2 is a longitudinal vertical section of the pan, showing the operating-handle in position to secure the loops or fastening device. Fig. 3 is an end view showing the handle in position for releasing the loop or fastening device. Fig. 4 is an end and side view showing a means of securing the rear ends of the pan. Fig. 5 is an enlarged detail.

My invention relates more particularly to the class of bake-pans shown and described in Patent No. 131,745, dated October 1, 1872, and the general features of construction and arrangement are very similar to this pan.

The pan consists of two portions A B, which are in effect ordinary open-mouthed pans, preferably having inclined sides, although the shape of the sides is not material. These pans are preferably made of sheet-iron, although the material will depend upon the purpose for which they are intended, and are strengthened around their edges with a wire C D, over which the metal is curled in the usual manner. At the rear end E of the pan A the wire is formed into a loop $e$, as best shown in Fig. 4, which loop extends upward parallel with the sides, being first bent outward to a slight extent, as clearly shown in said figure. The wire of the end F of the pan B is bent outward to form a loop $f$, the loop being preferably turned upward at its outer and somewhat contracted end. This upper loop $f$ is arranged to engage and slip through the loop $e$ when the pans are brought together and to serve as a securing device to hold the two pans securely in position in addition with the other locking devices. I find these loops thus formed from the wire are not only cheaper, but are better than plates attached thereto, for the reason, among others, that the interior face of the end of the pan is unbroken by rivets or otherwise, while, if necessary, the handle hereinafter described may be applied to the loop $f$ to lift the pan, as indicated in dotted lines, Fig. 4, if perchance that end of the pan is turned toward the operator.

In order that the pan may be held in perfect alignment and may be readily applied to each other and guided into position, I provide guides G G, arranged on the uppermost pan and formed by bending up a loop of the binding-wire D and projecting downward and inclined, as shown in Fig. 1, so as to fit accurately the interior of the lowermost pan. By this device the upper pan can be placed upon the lower pan with the guides projecting into the lower pan and the pans slid into position with the loop $f$ projecting through the loop $e$ when the pans are brought together, as shown in Fig. 1.

In order to secure the front ends of the pans together, I secure to the lower pan a plate H, which plate is formed with two projecting tongues $h$, forming a recess between them. Connected also to this plate, and passing through an opening $h'$ therein, is a spring-loop I, preferably substantially rectangular in outline. Attached to the pan B is a plate K, and this plate is provided with a tongue $k$, projecting downward from its center and arranged to fit in between the tongues $h$ of the plate H, and thereby prevent lateral movement of the pans when the edges are together. The upper portion of the plate K is provided with an outwardly-extending projection $i$, over which the upper and free outer end of the loop I is intended to embrace, the loop springing over the projection, and when in this position securely locking the two pans together. In order that this locking operation may be readily performed without danger of injury to the operator, I provide a handle L, preferably made of metal, and having its end formed, as shown most clearly in Fig. 2, being similar to a boot in general outline, having a toe $l$ and a heel $l'$. The upper plate K is provided with a recess $k'$, near its upper portion, preferably having a sharp edge on the lower portion of the recess made by cutting or beveling away the metal, and the projecting lip $i$ has a recess in the rear portion of it, as clearly shown in Fig. 2, for the reception of the toe of the handle. The tongue $k$ is also recessed on its upper portion, as most clearly shown in Fig. 3. Thus it will be seen that when it is desired to lift the upper pan, the toe $l$ of the handle is inserted in the opening behind the lip $i$ and the heel $l'$ bears on the recessed portion of the tongue $k$ and the pan is lifted, as clearly shown in Fig. 1, and can be manipulated to bring the two pans together or separate them or otherwise. When the article to be cooked is in the pans, and it is desired to close the pans, the handle L is turned over, so that the toe embraces the cut-away portion in the recess $k'$ of the plate K and the heel engages the upper portion of the loop I, and it can be sprung into position, as shown in Fig. 2, when the pans will be securely held together. When it is intended to release the pans, the handle can be placed in the position shown in Fig. 3 with the heel in the recess $k'$ and the toe engaging the upper portion of the loop I, when the latter can be sprung off from the bearing-lug or projection $i$ and the pans separated by changing the handle to the position shown in Fig. 1.

It will thus be seen that I provide means whereby the two pans constituting the baking-pan can be readily manipulated and secured together and taken apart without the necessity of touching them with the hands, and the guides projecting from the upper part aid in the arrangement or bringing together of the two pans and prevent lateral slipping, while the loops at the rear end and the fastening-loop at the front end secure the pans together.

The pans may be provided with a ventilator M, preferably located in the front end of the upper pan.

It will thus be seen that I provide a bake-pan which is simple and cheap in construction, and at the same time easily manipulated and the pans thoroughly secured together.

What I claim is—

1. The combination of the bake-pan consisting of two portions and provided with the fastening-plates, the one being a loop and the other a projection for the loop, of a handle having projections, substantially as described, by means of which the loop may be operated in the manner set forth, substantially as described.

2. The combination, with the pans, one of which is provided with a plate carrying a loop, the other of which is provided with a plate having a projection for the loop, and a recess below the loop, of a handle having a projecting toe-piece and a projecting heel-piece, substantially as described.

3. A bake-pan consisting of two pans arranged with their open sides adjacent to each other and having engaging-loops at their rear ends and locking devices at their front ends and provided with the guides G, arranged on the interior of the upper pan and projecting into the mouth of the lower pan, substantially as described.

4. A bake-pan consisting of two pans arranged with their open sides adjacent to each other, the pans being provided with engaging-lugs at their rear ends formed of the binding-wire, the upper pan having guides arranged on the interior and extending into the lower pan, locking-plates secured to the front ends of the pan, the lower plate being provided with an elastic loop and the upper plate being provided with a projection for the loop, and a handle provided with toe and heel projections adapted to manipulate the loop, substantially as described.

5. The combination, with the two separable pans arranged with their open faces adjacent to each other and having rocking devices for securing the pans together, of a handle provided with a toe and heel piece, substantially as described, whereby one of the pans can be removed and replaced and the pans locked and unlocked without danger of injury to the operator.

In testimony whereof I have signed my name to this specification in the presence of two subscribing witnesses.

ARTHUR C. DAGGETT.

Witnesses:
CHARLES S. STEVENS,
ERNEST C. WING.